US009783875B2

(12) United States Patent
Ursavas et al.

(10) Patent No.: US 9,783,875 B2
(45) Date of Patent: Oct. 10, 2017

(54) CAST IRON MATERIAL AND MOTOR VEHICLE PART MADE OF THE CAST IRON MATERIAL

(71) Applicants: Ford-Werke GmbH, Cologne (DE); Neue Halberg-Guss GmbH, Saarbruecken (DE)

(72) Inventors: Uemit Ursavas, Leverkusen (DE); Matthias Warkentin, Kerpen (DE); Maik Broda, Eschweiler (DE); Dirk Radebach, Remscheid (DE); Frank Ungerbuehler, Kirkel-Limbach (DE); Christoph Michels, Saarbruecken (DE)

(73) Assignees: Ford-Werke GmbH, Cologne (DE); Neue Halberg-Guss GmbH, Saarbruecken (DE)

( * ) Notice: Subject to any disclaimer, the term of this patent is extended or adjusted under 35 U.S.C. 154(b) by 0 days.

(21) Appl. No.: 14/376,695

(22) PCT Filed: Feb. 5, 2013

(86) PCT No.: PCT/DE2013/100039
§ 371 (c)(1),
(2) Date: Aug. 5, 2014

(87) PCT Pub. No.: WO2013/117190
PCT Pub. Date: Aug. 15, 2013

(65) Prior Publication Data
US 2014/0377122 A1    Dec. 25, 2014

(30) Foreign Application Priority Data
Feb. 7, 2012   (DE) .................. 10 2012 100 990

(51) Int. Cl.
C22C 37/10 (2006.01)
C22C 37/06 (2006.01)
F16D 65/12 (2006.01)
F02F 1/00 (2006.01)
F02F 1/18 (2006.01)
F02F 1/24 (2006.01)

(52) U.S. Cl.
CPC .............. C22C 37/10 (2013.01); C22C 37/06 (2013.01); F16D 65/12 (2013.01); *F02F 1/00* (2013.01); *F02F 1/004* (2013.01); *F02F 1/18* (2013.01); *F02F 1/24* (2013.01); *F16D 65/125* (2013.01); *F16D 2200/0013* (2013.01)

(58) Field of Classification Search
CPC ...................... C22C 37/10; F16D 2200/0013
USPC ............................... 420/15, 77, 28
See application file for complete search history.

(56) References Cited

U.S. PATENT DOCUMENTS

| | | | |
|---|---|---|---|
| 3,997,338 A * | 12/1976 | Van Eeghem | C21C 1/105 |
| | | | 420/13 |
| 4,501,612 A | 2/1985 | Stefanescu et al. | |
| 4,548,643 A | 10/1985 | Betts | |
| 5,858,127 A * | 1/1999 | Ott | C22C 37/04 |
| | | | 148/321 |
| 6,209,881 B1 * | 4/2001 | Michel | F16J 9/26 |
| | | | 277/440 |
| 6,444,055 B1 | 9/2002 | Laag et al. | |
| 2005/0217764 A1 | 10/2005 | Takayama | |
| 2009/0297386 A1* | 12/2009 | Takahashi | C22C 37/10 |
| | | | 420/28 |
| 2011/0041960 A1 | 2/2011 | Takahashi et al. | |

FOREIGN PATENT DOCUMENTS

| | | |
|---|---|---|
| CN | 1680612 A | 10/2005 |
| CN | 101407885 A | 4/2009 |
| DE | 1 458 915 A1 | 9/1969 |
| DE | 2132417 A1 | 1/1973 |
| DE | 689 06 489 T2 | 9/1993 |
| DE | 197 35 217 B4 | 2/1999 |
| DE | 10 2004 010 916 A1 | 9/2005 |
| DE | 10 2004 010 917 A1 | 9/2005 |
| JP | S62 240746 A | 10/1987 |
| JP | S63-140064 A | 6/1988 |
| JP | H04-272522 A | 9/1992 |
| WO | 01/06028 A1 | 1/2001 |
| WO | WO 2012048919 A1 * | 4/2012 ............. B22D 13/04 |

OTHER PUBLICATIONS

ASM International Handbook Committee. (1990). ASM Handbook, vol. 01—Properties and Selection: Irons, Steels, and High-Performance Alloys—Cast Irons. ASM International.*
Reardon, Arthur C.. (2011). Metallurgy for the Non-Metallurgist (2nd Edition)—10.2 Classification of Cast Irons. ASM International.*
International Preliminary Report on Patentability in PCT/DE2013/100039, dated Mar. 12, 2015.
International Search Report of PCT/DE2013/100039, dated Feb. 10, 2015.

* cited by examiner

Primary Examiner — Colleen Dunn
Assistant Examiner — Jeremy Jones
(74) Attorney, Agent, or Firm — Collard & Roe, P.C.

(57) ABSTRACT

The invention relates to a cast iron material with lamellar graphite formation. It further relates to a motor vehicle part made of the cast iron material.
In order to create a ferritic cast iron material having a higher thermal conductivity, it is proposed according to the invention that, in addition to Fe, the cast iron material contains
  3.9 to 4.2 wt. % C,
  0.3 to 0.9 wt. % Si and
  2.0 to 7 wt. % Al.
It has been demonstrated within the scope of the invention that not only the thermal conductivity but also the wear resistance and corrosion resistance of the material are increased in comparison to known cast iron materials.

23 Claims, No Drawings

CAST IRON MATERIAL AND MOTOR VEHICLE PART MADE OF THE CAST IRON MATERIAL

CROSS REFERENCE TO RELATED APPLICATIONS

This application is the National Stage of PCT/DE2013/100039 filed on Feb. 5, 2013, which claims priority under 35 U.S.C. §119 of German Application No. 10 2012 100 990.2 filed on Feb. 7, 2012, the disclosure of which is incorporated by reference. The international application under PCT article 21 (2) was not published in English.

BACKGROUND OF THE INVENTION

1. Field of the Invention

The invention relates to a cast iron material with lamellar graphite formation. It further relates to a motor vehicle part made of the cast iron material.

2. The Prior Art

Other materials than those used for cylinder crankcases are used for cylinder heads and brake discs because, for the latter two components, the thermal conductivity is the critical magnitude, not the strength. This is why cast iron with a perlitic matrix predominates in the case of cylinder crankcases, whereas predominantly ferritic cast iron with vermicular graphite is found in cylinder heads and a ferritic matrix in brake discs.

It is known practice to alloy ordinary cast iron with an addition of aluminium in order to reduce the density to a value below 7.2 $g/cm^3$. This reduces the weight of the component and serves the purpose of light-weight construction. It is also known that cast iron alloyed with aluminium exhibits scaling resistance, meaning that an oxide layer adhering firmly to the surface of the component reduces wear under temperature load. This oxide layer also prevents the formation of flash rust at room temperature, which is undesirable in practice. Especially in the case of brake discs, flash rust is unattractive on a vehicle up for sale.

SUMMARY OF THE INVENTION

A cast iron material of the iron/aluminium/carbon ternary group is known from the DE 197 35 217 B4, consisting (in weight percent) of 20 to 28% Al, up to 1% Si, more than 1 and up to 3% C, and Fe as the remainder, and having free carbon.

The object of the invention is to create a ferritic cast iron material which has a higher thermal conductivity.

This object is achieved according to the invention in that, in addition to Fe, the cast iron material contains 3.0 to 4.2 wt. % C,
0.3 to 0.9 wt. % Si and
2.0 to 7 wt. % Al.

It has been demonstrated within the scope of the invention that not only the thermal conductivity but also the wear resistance and corrosion resistance of the material are increased (values of up to 50 W/mkK were measured) in comparison to known cast iron materials. The specific combination of high thermal conductivity with high wear and corrosion resistance is required, but difficult to obtain, in many fields of engineering, for example in the field of brake materials. By virtue of the selected chemical composition, a "self healing" oxide layer (i.e. one which keeps re-forming) forms at temperatures as low as room temperature. Being particularly dense and adhesive, the oxide layer protects parts such as brakes from wear and corrosion. This oxide layer forms during heat treatment or, in general, under the influence of thermal load, for example on brake discs during braking. Particularly the elements Al and Si, when contained in the selected content range, form oxides ($Al_2O_3$, $SiO_2$). The formation of the oxide layer is controlled by the addition of Bi, which promotes the formation of a fine microstructure.

A prior-art cast iron material was found to have a superficial material loss of approx. 14.6 micrometres when subjected to a temperature of 600° C. for 20 minutes in an oxidizing atmosphere. When the cast iron component is in use, e.g. as a brake disc, this material loss constitutes high-temperature corrosion and therefore wear, which is undesirable. Under the same conditions, the material of the invention was found to undergo a superficial material loss of approx. 3.6 micrometres. The material according to the invention thus shows a 76% smaller superficial material loss, thereby significantly increasing the service life of castings such as brake discs. The smaller material loss is attributable to the formation of a surface-near $Al_2O_3$ layer, which, compared with the prior art, shows stronger adhesion and a lower hot cracking tendency. The prior-art material was found to have undergone hot cracking with formation of a crack network under the temperature load mentioned above. This crack network was characterised by a mean crack length of approx. 1,800 micrometres per $mm^2$ surface area. Under mechanical load caused by a friction surface, as, for example, in the case of brakes, this crack network leads to increased abrasive wear and thus reduces the service life. The crack network in the material of the invention was much less pronounced, having a mean crack length of less than 1,000 micrometres per $mm^2$ surface area. Some parts of the material showed no cracks after exposure to the temperature load. It follows that abrasive wear under a temperature load is less than in prior-art materials. In initial trials, the oxygen activity of the molten metal was measured and values of 67.8 and 42.4 ppb obtained (based on a temperature of 1,470° C.). These values, which are clearly less than the usual values of 800 to 1200 ppb for grey cast iron, demonstrate the high level of deoxidation due to the Al.

A preferred embodiment of the invention consists in that the cast iron material contains between 0.005 and 0.03, preferably between 0.01 and 0.02 and, best of all, between 0.02 and 0.03 wt. % Bi.

The invention is based on the finding that by adding Bi and increasing the C content above that of prior-art aluminium-alloyed cast iron materials, a finer microstructure with more homogeneously dispersed dendrites is obtained, leading to more homogeneous heat dissipation.

It is also within the scope of the invention that the cast iron material contains between 2.5 and 6, preferably between 3.0 and 5.5 and, best of all, between 3.5 and 5 wt. % Al.

Pure aluminium or deoxidation material from steel mills may be used as feed Al, care being taken that the accompanying elements in the Al do not constitute subversive elements in the cast iron material. In order to guarantee homogeneous mixing and simultaneously minimise loss by burning, it is important that the Al be added shortly before tapping.

It is within the scope of the invention that the cast iron material contains up to 0.08, preferably up to 0.06 or, best of all, up to 0.04 wt. % P.

It has proved advantageous for the cast iron material to contain up to 1.0, preferably up to 0.8 or, best of all, up to 0.6 wt. % Cu.

It is furthermore to advantage if the cast iron material contains up to 0.8, preferably up to 0.6 or, best of all, up to 0.4 wt. % Mn.

It is beneficial if the cast iron material contains up to 0.2, preferably up to 0.15 or, best of all, up to 0.1 wt. % Sn.

It is also within the scope of the invention that the cast iron material contains 0.02 to 0.15, preferably 0.04 to 0.10 or, best of all, 0.06 to 0.08 wt. % S.

It is furthermore to advantage if the cast iron material contains 0.1 to 0.3, preferably 0.15 to 0.25 or, best of all, 0.175 to 0.20 wt. % Cr.

A preferred embodiment of the invention consists in that the cast iron material contains up to 0.02, preferably up to 0.017 or, best of all, up to 0.015 wt. % Ti. It has been demonstrated within the scope of the invention that a small Ti content is of major importance The invention provides for the cast iron material to contain up to 40, preferably up to 30 or, best of all, up to 20 ppm Pb.

It is furthermore to advantage if the cast iron material contains 0.01 to 0.04, preferably 0.015 to 0.03 or, best of all, 0.02 to 0.025 wt. % Mo.

The accompanying elements were intentionally adjusted to very low concentrations in order to ensure the formation of a ferritic microstructure. This is why upper limits for these accompanying elements are specified.

The scope of the invention extends to vehicle parts made of the cast iron material according to the invention, these vehicle parts including, in particular, a cylinder head, a brake disc, a cylinder bore or a cylinder liner.

Where liners made of grey cast iron are used in aluminium engine blocks, it has been demonstrated that, through formation of the protective layer, a better connection between the grey cast iron and the aluminium material is obtained during casting.

DETAILED DESCRIPTION OF THE PREFERRED EMBODIMENTS

The invention is described below by reference to embodiments.

Embodiment 1:

A cast iron material is produced, which, in addition to Fe, contains 4.2 wt. % C
0.3 wt. % Si
5.9 wt. % Al
0.03 wt. % Bi
0.02 wt. % P
0.05 wt. % Cu
0.3 wt. % Mn
0.03 wt. % Sn All the remaining alloying elements excluding Fe make up <0.05 wt. %.

Embodiment 2:

A cast iron material is produced, which, in addition to Fe, contains 3.28 to 3.38 wt. % C
0.50 to 0.60 wt. % Si
up to 0.04 wt. % P
0.080 to 0.110 wt. % S
0.45 to 0.55 wt. % Mn
0.15 to 0.20 wt. % Cr
0.70 to 0.80 wt. % Cu
up to 0.015 wt. % Ti
3.00 to 3.30 wt. % Al
Maximum 30 ppm lead
0.08 to 0.10 wt. % Sn All the remaining alloying elements excluding Fe make up <0.05 wt. %.

Embodiment 3:

A cast iron material is produced, which, in addition to Fe, contains 3.28 to 3.38 wt. % C
1.20 to 1.30 wt. % Si
up to 0.04 wt. % P
0.080 to 0.110 wt. % S
0.45 to 0.55 wt. % Mn
0.15 to 0.20 wt. % Cr
0.70 to 0.80 wt. % Cu
up to 0.015 wt. % Ti
3.50 to 3.80 wt. %Al
maximum 30 ppm lead
0.02 to 0.03 wt. % Mo
0.09 to 0.12 wt. % V
0.08 to 0.10 wt. % Sn All the remaining alloying elements excluding Fe make up <0.05 wt. %.

The invention claimed is:

1. Cast iron material with lamellar graphite formation, wherein, the cast iron material consists of
   3.0 to 4.2 wt. % C,
   0.3 to 1.5 wt. % Si,
   3.0 to 7 wt. % Al,
   0.05 to 1.0 wt. % Cu,
   0.3 to 0.8 wt. % Mn,
   0.03 to 0.2 wt. % Sn,
   a maximum of 0.08 wt. % P,
   at least one element selected from the group consisting of
      0.005 to 0.03 wt. % Bi,
      0.02 to 0.15 wt. % S,
      0.1 to 0.3 wt. % Cr,
      a maximum of 0.02 wt. % Ti,
      0.01 to 0.04 wt. % Mo,
      0.06 to 0.12 wt. % V,
      a maximum of 40 ppm Pb,
   and remainder Fe.

2. Cast iron material according to claim 1, wherein the cast iron material contains between 0.02 to 0.03 wt. % Bi.

3. Cast iron material according to claim 1, wherein the cast iron material contains between 3.0 to 6.0 wt. % Al.

4. Cast iron material according to claim 1, wherein the cast iron material contains up to 0.06 wt. % P.

5. Cast iron material according to claim 1, wherein the cast iron material contains between 0.05 to 0.8 wt. % Cu.

6. Cast iron material according to claim 1, wherein the cast iron material contains between 0.3 to 0.6 wt. % Mn.

7. Cast iron material according to claim 1, wherein the cast iron material contains between 0.03 to 0.15 wt. % Sn.

8. Cast iron material according to claim 1, wherein the cast iron material contains 0.04 to 0.1 wt. % S.

9. Cast iron material according to claim 1, wherein the cast iron material contains 0.15 to 0.25 wt. % Cr.

10. Cast iron material according to claim 1, wherein the cast iron material contains up to 0.017 wt. % Ti.

11. Cast iron material according to claim 1, wherein the cast iron material contains 0.015 to 0.03 wt. % Mo.

12. Cast iron material according to claim 1, wherein the cast iron material contains 0.07 to 0.11 wt. % V.

13. Vehicle part made of a cast iron material according to claim 1, said vehicle part being a cylinder head, a brake disc, a cylinder bore or a cylinder liner.

14. Cast iron material according to claim 3, wherein the cast iron material contains between 3.0 and 5.5 wt. % Al.

15. Cast iron material according to claim 4, wherein the cast iron material contains up to 0.04 wt. % P.

16. Cast iron material according to claim 5, wherein the cast iron material contains between 0.05 to 0.6 wt. % Cu.

17. Cast iron material according to claim 6, wherein the cast iron material contains between 0.3 to 0.4 wt. % Mn.

18. Cast iron material according to claim 7, wherein the cast iron material contains between 0.03 to 0.1 wt. % Sn.

19. Cast iron material according to claim 8, wherein the cast iron material contains 0.06 to 0.08 wt. % S.

20. Cast iron material according to claim 9, wherein the cast iron material contains 0.175 to 0.2 wt. % Cr.

21. Cast iron material according to claim 10, wherein the cast iron material contains up to 0.015 wt. % Ti.

22. Cast iron material according to claim 11, wherein the cast iron material contains 0.02 to 0.025 wt. % Mo.

23. Cast iron material according to claim 12, wherein the cast iron material contains 0.08 to 0.1 wt. % V.

\* \* \* \* \*